Aug. 30, 1966 S. BRAUNER 3,269,569
ROTARY VEHICLE PARKING APPARATUS
Filed April 20, 1964 3 Sheets-Sheet 1

INVENTOR.
SHLOMO BRAUNER
BY
ATTORNEY

INVENTOR.
SHLOMO BRAUNER
BY
ATTORNEY

INVENTOR.
SHLOMO BRAUNER
BY
ATTORNEY

United States Patent Office 3,269,569
Patented August 30, 1966

3,269,569
ROTARY VEHICLE PARKING APPARATUS
Shlomo Brauner, 46 Yahalom St., Ramat-Gan, Israel
Filed Apr. 20, 1964, Ser. No. 360,812
Claims priority, application Israel, Nov. 27, 1963,
20,339
1 Claim. (Cl. 214—16.1)

The present invention relates to storing apparatus, and particularly to apparatus for providing off-street parking for automotive vehicles.

The constantly increasing use of automotive vehicles has created serious parking problems which in many places can be eased or solved only by providing off-street parking facilities for the vehicles.

An object of the present invention is to provide improved apparatus for storing articles, and particularly for storing automotive vehicles, in a compact and easily accessible manner.

When used for vehicle-storing, such apparatus is capable of storing a relatively large number of vehicles in a relatively small volume of space. The apparatus may be incorporated in specially-built garages, in residential or commercial buildings to provide off-street parking facilities for its tenants or other users, or in other environments.

Further features and advantages of the invention will be apparent from the description below.

The accompanying drawings illustrate, diagrammatically and by way of example only, several preferred embodiments of the invention. In the drawings.

Figure 2:
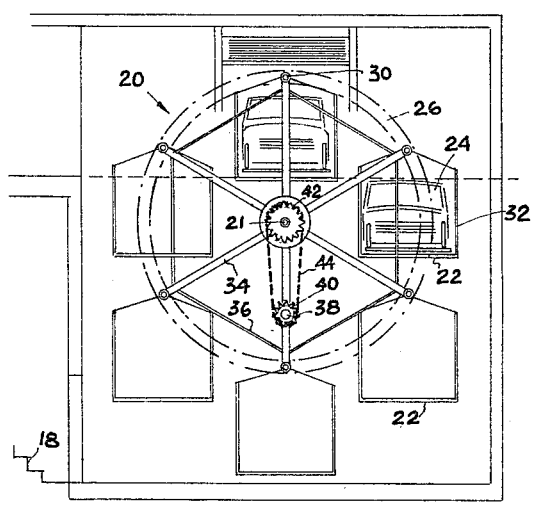
FIG. 2 is an end view of the apparatus illustrated in FIG. 1.
Figure 4:
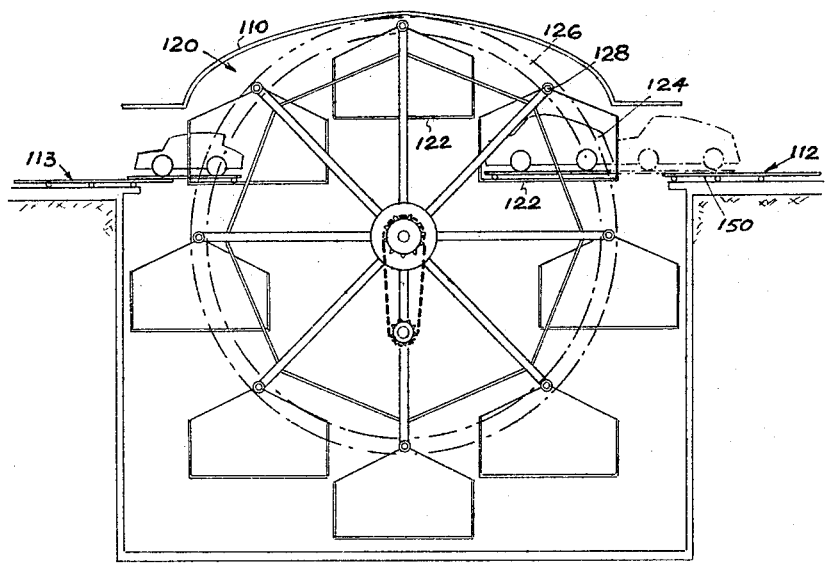
FIG. 4 is an end view, shown also diagrammatically, of another form of apparatus constructed in accordance with the invention.
Figure 6:
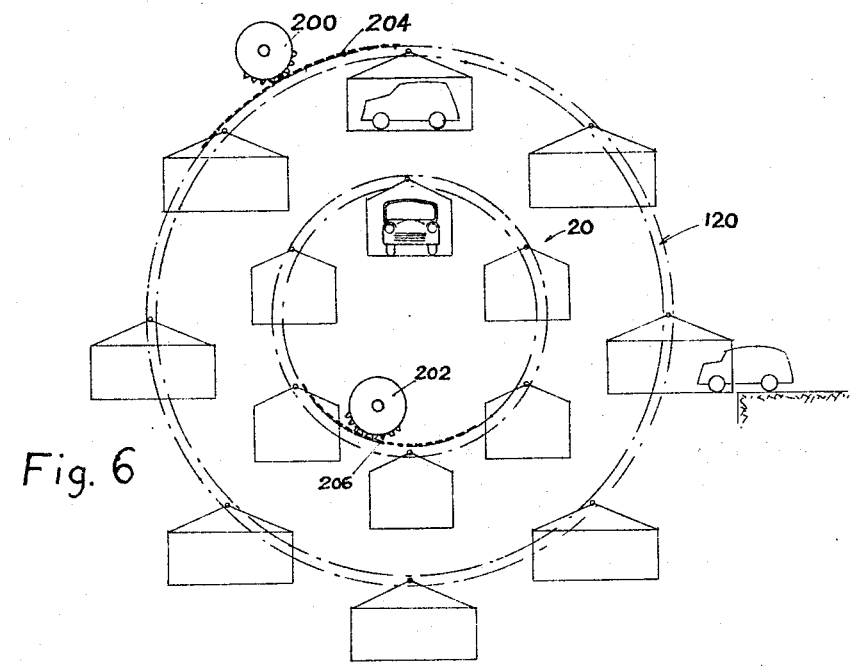
Figure 7:
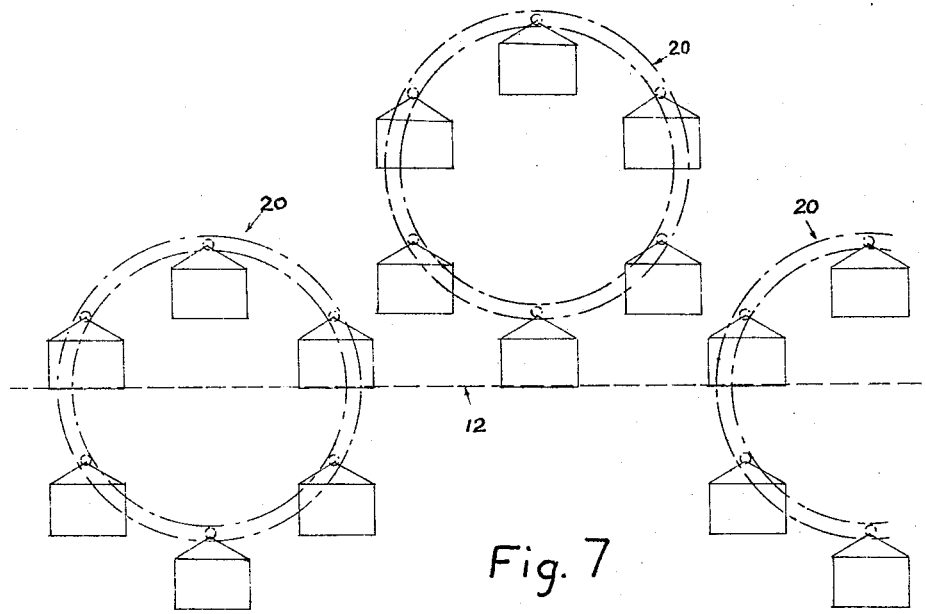

FIG. 6 diagrammatically illustrates how the forms of the apparatus illustrated in FIGS. 2 and 4 may be combined to produce a unit of still greater capacity; and FIG. 7 diagrammatically illustrates how a plurality of the units of FIG. 2 may be constructed to provide maximum capacity in a minimum of space.

Referring first to the embodiment of the invention illustrated in FIGS. 1-3, there is shown a building 10 (FIG. 1) constructed on a plot of land whose level is indicated by the reference numeral 12, the building 10 penetrating into the ground to provide an above-ground area 14 and a below-ground or basement area 16. The above-ground area 14 may be used for residential quarters, commercial space, or the like. The ground floor of the building and a part of the basement area 16, accessible by stairs 18 (FIG. 2), houses the vehicle storing apparatus constructed in accordance with the invention.

The vehicle storing apparatus comprises a frame structure, generally identified by the reference numeral 20, rotatably supported between pins or stub shafts 21, the frame structure having a plurality of platforms 22 each adapted to support a vehicle 24. Means are provided, to be described below, for rotating frame structure 20 to bring each of the platforms successively to ground level 12 for loading and unloading the vehicles onto the platforms.

For rotatably supporting the frame structure 20, the building 10 is provided with a pair of spaced fixedly mounted, closed-loop or circular tracks 26 (FIG. 3), one supporting each end of the frame structure. The frame structure includes a plurality of horizontally extending beams 28 each carrying a roller 30 at each end thereof rotatably received in tracks 26. One of the platforms 22 is pivotably mounted to each of the beams 28 by a cage 32, this mounting permitting the platform 22 to pivot on beam 28 and to therefore always assume a horizontal position because of its weight. The frame structure 20 may include any suitable reinforcing means, such as radial braces 34 and reinforcing members 36.

The drive for the rotatable frame structure comprises a drive shaft 38 (FIG. 2) coupled to any suitable source of power, such as an electric motor, 39, drive shaft 38 being connected to a sprocket 40 which is in turn coupled to a sprocket 42 by means of a chain 44, sprocket 42 being in turn connected to the frame structure 20.

From the foregoing, it will be appreciated that when the motor 39 is energized, the frame structure 20 will be rotated about shafts 21, rollers 30 of beams 28 riding in the circular track 26 during this rotary movement. As the frame structure rotates, the platforms 22 pivot on beams 28 so that they always assume the horizontal position illustrated, and each platform is successively brought to ground level 12 to permit loading or unloading the vehicles thereon. Conventional controls may be provided for starting and stopping the frame structure during these operations.

In the illustrated arrangement, circular tracks 26 are fixed to the building and the rollers 30 carried by beams 28 are rotatable with the frame structure. It will be appreciated that these parts could be reversed, and that circular track 26 could be incorporated in the rotatable frame structure, one at each end of the frame, and rotably mounted between roller-carrying supports fixed to the building or other supporting surface.

Figure 3:
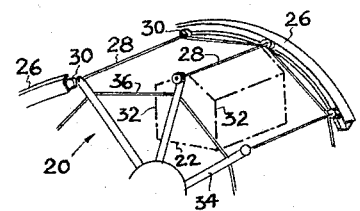
FIG. 3 is a perspective view of a portion of the apparatus of FIG. 1.
Figure 1:
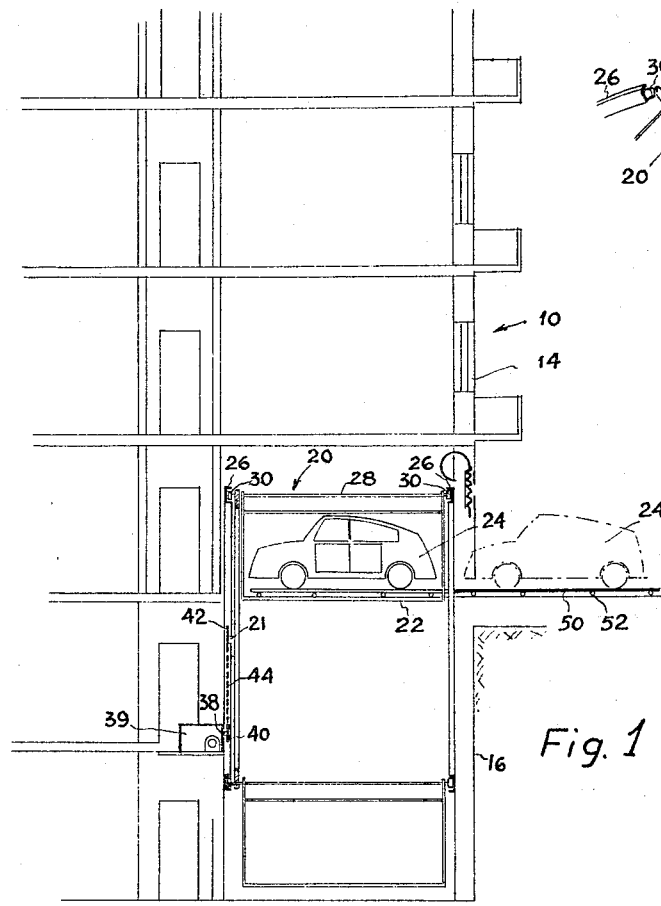
FIG. 1 is a diagrammatic side elevational view of one form of vehicle storing apparatus constructed in accordance with the invention.

In the arrangement of FIGS. 1-3, a skid 50 is provided at the loading point of the platform 22 so as to facilitate loading and unloading of the vehicle. It will be noted in this arrangement that the vehicles are disposed lengthwise between the circular tracks 26. It might not be convenient, therefore, for the driver of the vehicle to actually drive the vehicle onto the platform 22, when parking the car, since there might not be enough room for him to leave the car and the vehicle storing apparatus from the platform. For this reason skid 50 is provided so that the driver may drive his vehicle onto the skid, and then alight from the vehicle and move the skid together with the vehicle onto the platform 22. The skid 50 is mounted on rollers 52, and therefore it may be moved manually, or it may be moved by power, such as an electrical motor. The skid may remain on the platform 22 until it is desired to remove the vehicle, whereupon the skid and the vehicle are removed. Alternatively, there could be one skid for all the platforms, whereupon the skid would be controlled so that a vehicle may be driven thereon, the skid then actuated to move the vehicle into the apparatus, and then removed empty from the apparatus so as to be in position for storing another vehicle on another platform.

Figure 5:
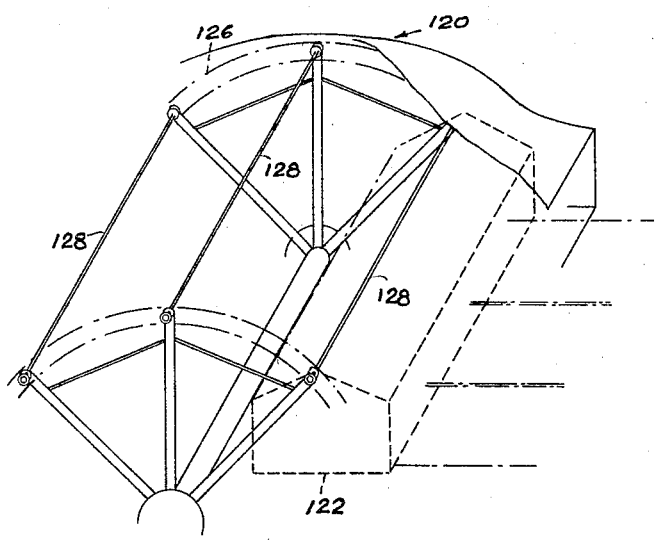
FIG. 5 is a perspective view, also diagrammatic, of a portion of the apparatus illustrated in FIG. 4.

FIGS. 4 and 5 illustrate another apparatus constructed in accordance with the invention. The apparatus of FIGS. 4 and 5 is particularly useful for storing a large number of cars, such as for example in a specially-built garage.

The rotatable frame structure in the apparatus of FIGS. 4 and 5 is very similar to that described below with respect to the apparatus of FIGS. 1-3. It is generally identified by the reference numeral 120, and includes the platforms 122 each adapted to carry a vehicle 124, the frame structure being rotatably supported, about its shaft 121, between a pair of circular tracks 126 by the beams 128 which pivotably mount the platforms 122. The remaining elements are very similar to those in FIGS. 1–3 and therefore have not had reference numerals applied to them. It will be noted in this embodiment, however, that the platforms 122 are arranged so that the vehicles 124 are disposed width-wise between the circular tracks 126. This arrangement permits at least two vehicles (the illustrated arrangement being designed for three) to be supported on each of the platforms 122, and therefore the capacity of the FIGS. 4 and 5 apparatus is much larger than that of the apparatus of FIGS. 1–3.

The arrangement of FIGS. 4 and 5 also permits the vehicles 24 to be loaded at one point 112, and to be unloaded at another point 113 at the other side of the apparatus.

FIG. 4 also illustrates the use of the skids 150 for loading and unloading the vehicles. However, in this arrangement, it might be easier for the driver to drive his vehicle onto the platform 122, and then to alight from the platform, which would obviate the use of the skids 150 altogether.

In the FIGS. 1–3 version, six platforms 22 are illustrated for parking six vehicles, this being a reasonable capacity for a small apartment building or the like. Two or more of such units could be included in one building if it is desired to increase the parking capacity. In the FIGS. 4 and 5 version, there are shown eight platforms, each platform capable of accommodating three vehicles, thus producing a capacity of 24 vehicles for the complete apparatus. Such an arrangement might be practical for a specially-built garage, the roof of which is indicated by the reference numeral 110 in FIG. 4. It will of course be appreciated that more or less platforms could be included, each platform providing space for fewer or more vehicles, as desired.

FIGS. 6 and 7 illustrate further arrangements for increasing the capacity of the apparatus.

In FIG. 6, a unit 20 similar to that of FIGS. 1–3 is housed within a unit 120 similar to that of FIGS. 4 and 5. In this arrangement, the two units are preferably driven by sprocket wheels 200 and 202 cooperating with chains 204 and 206, respectively carried by the two units. The units in FIG. 6 may be arranged so that the loading and unloading points are at different ground levels than those for unit 20, as shown, or at the same ground level.

In FIG. 7, a plurality of units 20 similar to those in FIGS. 1–3 are arranged in a line. As shown, the centers of rotation of successive units in a line are staggered, that is, the center of alternate ones is above that of the remaining alternate ones, this providing a compact arrangement of units.

It is to be understood that the described embodiments of the invention are illustrative only, and that many other embodiments, variations and applications of the invention, or the several features thereof disclosed, may be made without departing from the spirit and scope of the invention as defined in the following claim.

I claim:

Vehicle parking apparatus, comprising: a pair of circular tracks fixedly mounted in spaced relationship with respect to each other; a plurality of platforms each adapted to support a vehicle; and means for rotatably mounting said platforms to said circular tracks; said mounting means including a rigid frame structure rotatably mounted between said pair of circular tracks, a drive for rotating said rigid frame structure, a pair of rollers for each platform carried by said rigid frame structure each received in one of said circular tracks, and a pivotable mounting between each platform and its respective pair of rollers for supporting the platform in suspension therefrom such that the platform always assumes a horizontal position by gravity, said rigid frame structure including radially extending braces, and a horizontal beam connected between each pair of rollers, each of said platforms being pivotally mounted in suspension to one of said beams.

References Cited by the Examiner

UNITED STATES PATENTS

| 1,800,059 | 4/1931 | Egan. | |
|---|---|---|---|
| 1,841,530 | 1/1932 | Geiger. | |
| 2,691,448 | 10/1954 | Lontz | 214—16.11 X |
| 2,728,467 | 12/1955 | Glicker. | |
| 2,738,885 | 3/1956 | Demaline. | |
| 3,085,700 | 4/1963 | O'Sullivan | 214—16.12 |

FOREIGN PATENTS

| 748,000 | 4/1956 | Great Britain. |
|---|---|---|
| 570,759 | 12/1957 | Italy. |
| 599,430 | 11/1959 | Italy. |

GERALD M. FORLENZA, *Primary Examiner.*

R. B. JOHNSON, *Assistant Examiner.*